April 19, 1938.  A. A. NEFF  2,114,352
PROCESS OF NEUTRALIZING HIGH BOILING PETROLEUM OILS
Filed Sept. 29, 1936
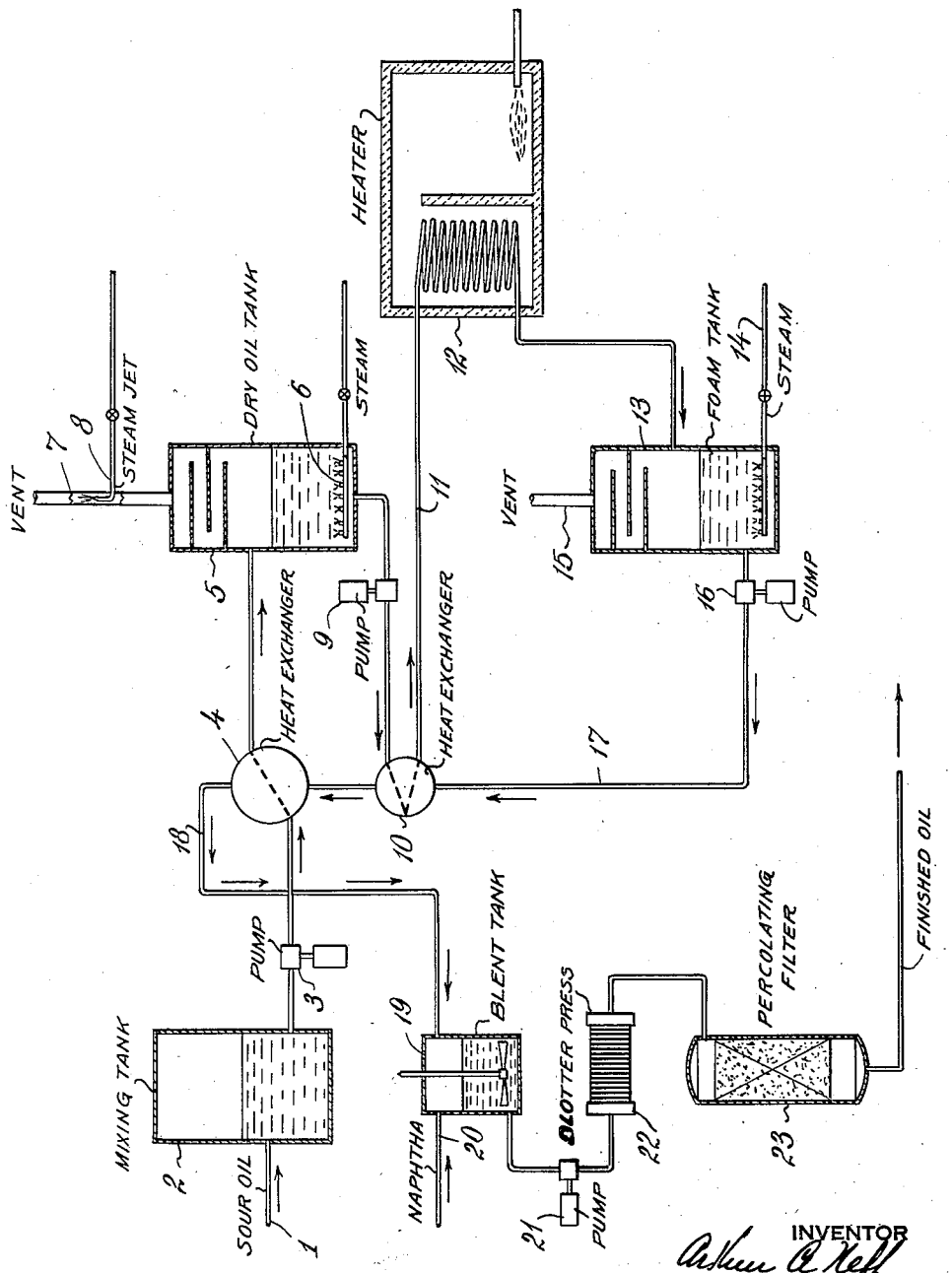
INVENTOR
Arthur A. Neff
BY
ATTORNEY Patented Apr. 19, 1938

2,114,352

UNITED STATES PATENT OFFICE 2,114,352

PROCESS OF NEUTRALIZING HIGH BOILING PETROLEUM OILS

Arthur A. Neff, Paulsboro, N. J., assignor to Socony-Vacuum Oil Company, Incorporated, New York, N. Y., a corporation of New York Application September 29, 1936, Serial No. 103,066

2 Claims. (Cl. 196—1)

This invention is directed to the refining of oils, and particularly to the step of neutralizing high boiling point oils which have been acid treated.

High boiling point petroleum fractions, of the nature of lubricating oils, transformer oils, and the like, are customarily refined by treatment with sulphuric acid, for the precipitation of asphaltic and color forming constituents, and the like, resulting in the production of a sludge, which is settled and withdrawn, to be discarded, and a so-called "sour" oil, which is neutralized and further refined for the production of finished products. This invention has to do specifically with this step of neutralization.

There are two general methods of neutralization practiced at present. The older method is by treatment with aqueous solutions of caustic soda. This may be, and usually is, preceded by a "gas blow", in which the sour oil is thoroughly blown and agitated with air to remove, in so far as possible, all dissolved sulphur dioxide, and other oxides of sulphur which may be displaced during blowing. The sour oil at the end of the "gas blow" is still high in acidity, and is then neutralized by treatment with aqueous caustic soda. This operation is discontinuous, time consuming, and frequently encounters difficulties with emulsions, loss of oil color, and other troubles. A more modern method is one in which the sour oil is admixed with a small amount of alkaline absorbent clay, such as about 3-5% of fuller's earth and the like, heated moderately, subjected to a "gas blow" operation at temperatures ranging from 200° F. to about 350° F., and the mixed slurry of oil and clay then heated to about 700° F., after which it is cooled and the oil and clay separated by filtration. This process uses fine clay, and requires the use of filter presses, thickeners, extractors, and the like for removal and recovery of the clay. Not only is there an added expense for clay purchase, but the operative steps of clay removal are frequently in trouble, and give rise to high operative and maintenance expense.

The object of this invention is to provide a quick and efficient method for continuous neutralization of sour oil which does not make use of admixed absorbent nor of caustic solutions.

This invention is based upon the discovery that complete neutralization may be attained by the application of heat and proper agitation with inert gas. In order to more completely understand this invention, reference is made to the drawing attached to this specification, the single figure of which sets forth the process in diagrammatic form. In this drawing, the sour oil enters through pipe 1 into mixing tank 2 which serves as an accumulator for the system. From tank 2 the oil is forced by pump 3 through heat exchanger 4, where it is heated to 300/350° F. and then enters dry oil tank 5, which is equipped with a bottom steam spray 6 and a vent 7, in which is mounted a steam jet 8 to provide a moderate vacuum in tank 5. The hot oil is steamed thoroughly in tank 5, under the vacuum existing therein, and is then withdrawn by pump 9 and passed through heat exchanger 10, being heated to about 400° F. and then passes through line 11 and furnace heater 12, where it is heated to a temperature of 650/700° F. It is then discharged into foam tank 13, equipped with steam spray 14 and vent 15, where gases formed during the second heating are expelled. The oil is then forced by pump 16 through pipe 17, heat exchangers 10 and 4, and pipe 18 into blending tank 19, where it is mixed with naphtha entering through pipe 20 in sufficient quantity to very materially reduce its viscosity. The solution from the blending tank is then strained to remove adventitious solid matter and secure desired finish color by being forced by pump 21 through blotter press 22, after which it passes through percolation filter 23, (charged with absorbent clay), and is removed from the process as finished oil. With this process, without the use of caustic and without contacting the sour oil with clay, it is quite possible to secure the same freedom from acidity as with former procedure. The blotter press and percolator, formerly charged with the duty of removing about 5% of fine clay from the oil, and constantly in difficulty, now only clarify the oil solution, and remain on stream great periods of time without attention. Cost of clay consumed is completely avoided, and operating attendance is greatly lessened.

This capability of the process arises from its feature of heating in two stages, each followed by thorough agitation and sweeping with inert gas to remove the acidic constituents so set free. In place of the steam, any inert gas, such as $CO_2$, and the like may be used, although steam is to be preferred. The process may be carried out in other apparatus setups which will suggest themselves to the man skilled in the art as equivalents of that which is herein disclosed by way of example only and not for the purpose of limiting the disclosure thereby.

I claim:

1. A process for completely neutralizing "sour"

acid-treated high-boiling petroleum fractions without the use of adsorptive, agglomerative, or alkaline materials comprising the following steps: heating the oil to a temperature of from 300° to 350° F., and thoroughly agitating with inert gas while subjecting the oil to subatmospheric pressure, thereafter further heating the oil to a temperature of from 650° to 700° F., and further thoroughly agitating with an inert gas.

2. A process for finishing "sour" acid-treated high-boiling petroleum fractions comprising the following steps; heating the oil to a temperature of from 300° to 350° F. in the absence of alkaline, adsorptive, or agglomerative material, thoroughly steaming the oil so heated under a subatmospheric pressure, thereafter further heating the oil in the absence of alkaline, adsorptive, or agglomerative material to a temperature of from 650° to 750° F., thoroughly steaming the oil so heated, cooling the oil, adding thereto a viscosity-reducing diluent, subjecting diluted oil to a slight straining filtration, and removing diluent.

ARTHUR A. NEFF.